(12) United States Patent
Eberling et al.

(10) Patent No.: US 6,523,625 B2
(45) Date of Patent: Feb. 25, 2003

(54) 6×2 SUSPENSION CONTROL FOR AUTOMATIC TRACTION CONTROL

(75) Inventors: Charles E. Eberling, Wellington, OH (US); William P. Amato, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 09/742,072

(22) Filed: Dec. 20, 2000

(65) Prior Publication Data

US 2002/0074746 A1 Jun. 20, 2002

(51) Int. Cl.[7] .......................... B60G 17/52; B60G 17/56
(52) U.S. Cl. ................... 180/24.02; 280/5.504; 280/6.157; 280/124.16
(58) Field of Search .................. 180/24.02, 209; 280/5.504, 6.157, 6.159, 86.5, 124.16, 683

(56) References Cited

U.S. PATENT DOCUMENTS

| | | | | |
|---|---|---|---|---|
| 4,141,430 A | * | 2/1979 | Eddy, Jr. ................. | 180/24.02 |
| 4,993,729 A | * | 2/1991 | Payne .................... | 180/24.02 |
| 5,845,723 A | * | 12/1998 | Hirahara et al. .......... | 180/24.02 |
| 6,036,199 A | | 3/2000 | Oshida et al. | |
| 6,308,793 B1 | * | 10/2001 | Eberling ................. | 180/24.02 |

FOREIGN PATENT DOCUMENTS

| | | |
|---|---|---|
| DE | 2435099 A1 | 2/1975 |
| FR | 2590525 | 5/1987 |
| WO | 98/30404 | 7/1998 |
| WO | 00/27688 | 5/2000 |
| WO | 00/56561 | 9/2000 |

OTHER PUBLICATIONS

Elec Trac Electronic Traction Controller System, "Electronic Traction Controller Systems Stop Spinout", 2 pages, Detroit Automotive (Division of Aspro, Inc.), undated.*

Granning Air Suspensions Tag or Pusher with Detroit Automotive Elec Trac Traction Control System, "Air Suspension Combined with Spinout Control Keeps Trucks Moving", 2 pages, Granning Suspensions, Inc. undated.*

AlliedSignal Bedix Service Data SD–03–954, "ValuTrac Antilock Traction System", pp. 1–16, AlliedSignal Truck Brake Systems Co., Sep. 1999.

* cited by examiner

Primary Examiner—Peter C. English
(74) Attorney, Agent, or Firm—Calfee, Halter & Griswold LLP

(57) ABSTRACT

A system and method for improving the traction of a vehicle uses weight distribution control to improve wheel to driving surface friction. A driven axle and a non-driven axle support a vehicle load through adjustable suspension members. The suspension members are, for example, air bags. Actuators and controllers adjust the suspension members in a selectable predetermined manner. The selection can be based on operator preference, vehicle operating mode, or a sensed loss of traction. The driven axle carries a drive axle maximum rated load in order to maximize drive wheel traction at all times.

13 Claims, 5 Drawing Sheets

6×2 SUSPENSION CONTROL FOR AUTOMATIC TRACTION CONTROL

CROSS-REFERENCE TO RELATED APPLICATION

Commonly owned, copending application Ser. No. 09/107,620, filed May 3, 2000 and commonly owned U.S. Pat. No. 6,308,793 relate to an improved traction and suspension control assembly. The disclosures of this application and patent are hereby incorporated by reference.

This invention pertains to a traction and suspension control assembly associated with an air braking system for a tractor/trailer vehicle. The invention is particularly applicable to vehicles such as trucks/tractor systems known as a 6×2 vehicle employing a traction control system with air suspension control transfer. It will be appreciated, however, that the invention may have broader applications and may be advantageously employed in related environments or applications.

BACKGROUND OF THE INVENTION

1. Field of Invention

This invention pertains to a proportional control valve for a suspension assembly associated with an air braking system for a tractor/trailer vehicle. The invention is particularly applicable to vehicles such as trucks/tractor systems known as a 6×2 vehicle employing a traction control system with air suspension control transfer. It will be appreciated, however, that the invention may have broader applications and may be advantageously employed in related environments or applications.

2. Description of Related Art

By way of brief background, a 6×4 truck and tractor system employs a pair of drive axles. As will be appreciated, the vehicle cost associated with a pair of drive axles is substantially greater than a 6×2 arrangement, i.e., a system in which only one of the two rear axles is a drive axle, because of the additional drive components. Since a 6×4 system has increased weight, operating costs, complexity, maintenance costs, friction, and fuel consumption associated therewith, a 6×2 assembly is highly desirable. On the other hand, a 6×2 system has decreased traction capabilities relative to a 6×4 configuration. Accordingly, a 6×2 system using an air suspension control to transfer load to the drive axle has been proposed as a preferred arrangement that achieves enhanced traction control.

Generally, traction control systems employ similar principles to antilock braking systems on wet or slippery surfaces, curves, split surfaces, ice, and the like. Traction control assemblies sense when the wheels of a vehicle spin upon acceleration. This is representative of a loss of traction between the road surface and the tire. In response, drive torque is transferred to the non-spinning tires or wheels and a braking force is gently applied to the spinning wheel. This transfers the torque through the differential to the non-spinning, or more slowly spinning wheel. If both wheels spin, then the engine RPM is electronically controlled and reduced to an appropriate level.

As briefly indicated above, it has been proposed to shift or transfer the vehicle load in a 6×2 arrangement. An air bag suspension assembly associated therewith reduces the suspension bag pressure in the non-drive axle so that more weight is transferred to the drive axle. In this manner, an increased portion of the load is transferred to the drive axle to enhance traction.

Prior systems allow for load transfer manually, i.e., via driver input, or automatically with wheel slip and the onset of an automatic traction event. Manual systems that allow for load transfer are cumbersome and always present the potential for mis-use by an operator. On the other hand, if load transfer occurs automatically only after a loss of traction, then some adhesion with the road surface is already lost. This loss of adhesion can make the vehicle more difficult to move.

Different driving conditions and different operator preferences require different traction control strategies. Thus, a need exists for a traction control system that can be operated in a plurality of operating modes based on vehicle operation, operator preference, or operating conditions.

SUMMARY OF THE INVENTION

To those ends, a system and method operative to enhance the traction of a vehicle have been developed. The system comprises a drive axle, a non-drive axle, a suspension assembly operative to support a vehicle load, and an actuator assembly operatively associated with the suspension assembly for selectively transferring a predetermined ratio of vehicle load from one axle to the other axle. The method comprises the steps of providing a suspension force to a suspension control assembly associated with the drive axle, providing a suspension force to a suspension control assembly associated with the non-drive axle and regulating the forces provided to the suspension control assemblies in response to a control signal so as to control an amount of weight born by the drive axle in a plurality of predetermined manners.

According to the present invention, a proportional load transfer valve shifts weight from a non-drive or tag axle to a drive axle in response to a signal from the traction control assembly during a traction event.

A principal advantage of the invention is the ability to control the load transfer of the weight from the tag axle to the drive axle for enhanced traction control.

Another advantage of the invention resides in the automated operation of the transfer that is responsive to a traction event.

Yet another advantage of the invention is found in the ability to selectively transfer weight to the drive axle under normal operating conditions in order to prevent a traction event.

A further advantage of the present invention is the ability to change traction control strategy based on vehicle operating mode, for example using a first strategy or mode when in a low gear and a second strategy or mode when in a high gear.

Still another advantage of the invention is found in the ability to limit the proportional load transfer.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in the specification and illustrated in the accompanying drawings. The drawings include.

DETAILED DESCRIPTION OF THE PREFERRED EMBODIMENTS

Figure 1:
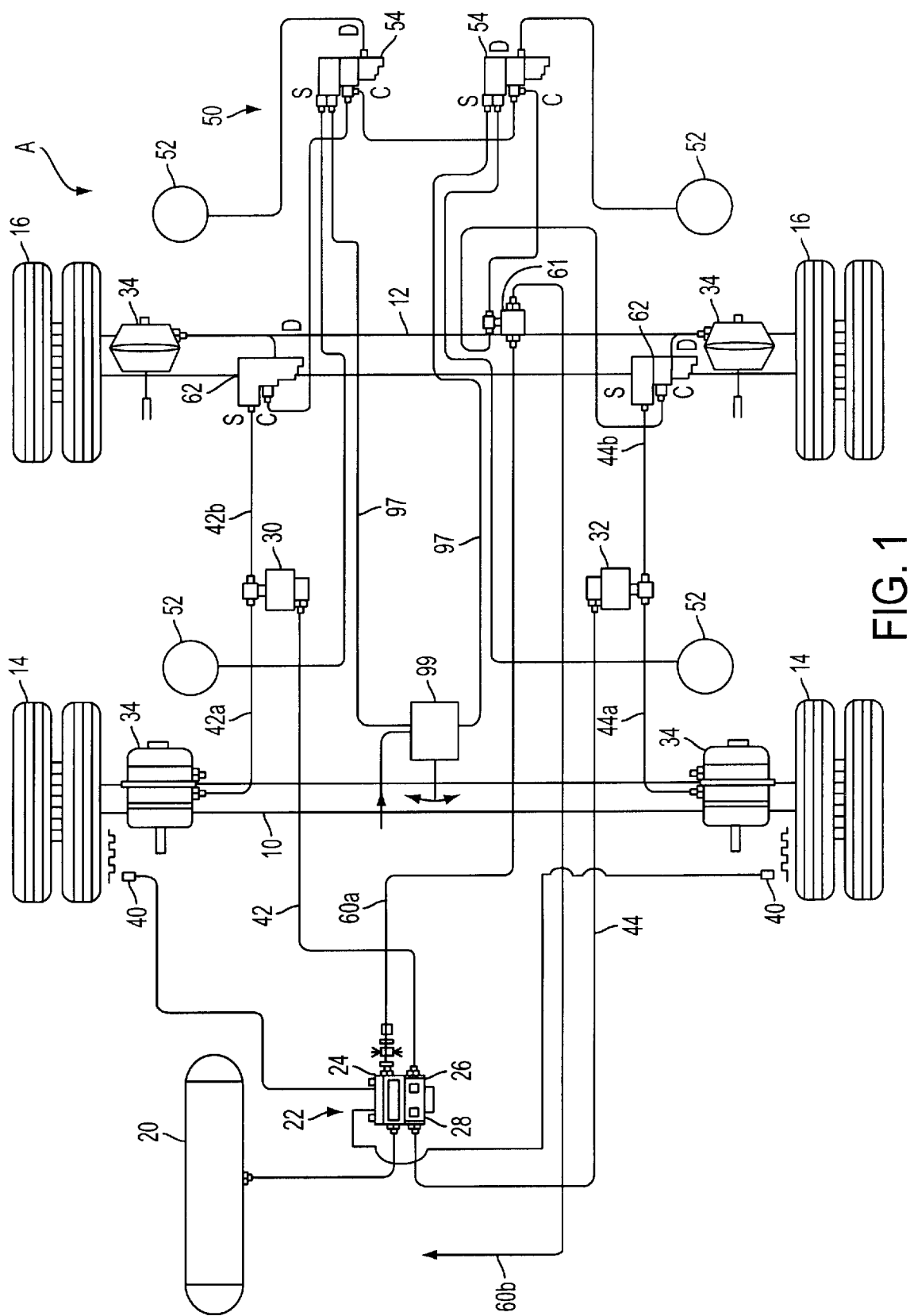
FIG. 1 which is a schematic representation of a 6×2 traction control system with an air suspension assembly that transfers load between the drive and tag axles.

Referring now to the drawings which illustrate preferred embodiments of the invention only and are not intended to limit the invention, the FIGURES show a traction and suspension control assembly A used in a tractor/trailer vehicle. More particularly, FIG. 1 schematically illustrates a 6×2 traction control system for a tractor cab having a first or drive axle 10 and a second or non-drive axle 12. Mounted on opposite ends of the axles are rear wheels 14, 16, respectively, that support the weight imposed on the tractor when it pulls a loaded trailer, or in an unloaded condition known as a bobtail mode. In this 6×2 system, only one of the axles is driven and the second or rear axle, known as a tag axle, aids in supporting the weight from the trailer.

The illustrated tractor shown in FIG. 1 is equipped with a conventional antilock/traction control assembly commercially available, for example, from the assignee of the present application. The antilock/traction control system includes a source of compressed air represented by cylinder 20. As is well-known in the art, a compressor periodically charges the cylinder so that a sufficient air supply or reservoir is provided for braking and suspension needs. The pressurized air is supplied to an antilock/traction controller 22 which includes an antilock electronic control unit 24 and a traction solenoid valve 26 and relay valve 28. The controller regulates air to modulator valves 30, 32 which supply air brake actuators 34 associated with the rear wheels 14, 16.

Sensors 40 are associated with the wheels 14 on the drive axle 10 to monitor the rotation of the wheels. The sensors provide representative signals of wheel spinning conditions to the control unit. If a wheel is spinning, i.e., a differential traction control event is sensed, braking is gently applied to the spinning wheel. Likewise, if all of the drive wheels are slipping, the RPM of the engine can be reduced and braking gently applied to the wheels. This transfers torque to the wheel(s) in a manner well-known with conventional traction control assemblies. Line 42 and first branch passage 42a extend from modulator 30. Line 44 and first branch passage 44a extend from modulator 32. Lines 42 and 44 and first branch passages 42a and 44a supply the brake actuators 34 associated with the drive axle 10. Likewise, second branch passages 42b, 44b communicate air to the brake actuators 34 associated with the non-drive wheels 16.

An air bag suspension assembly 50 is also schematically represented in FIG. 1. It includes air bags 52 disposed in pairs adjacent the wheels of the first and second axles. By selectively increasing or decreasing pressure in the air bags, the vehicle load or weight can be shifted between the drive and non-drive axles. As will be appreciated, the air bags associated with one of the axles work in tandem to shift the vehicle load as desired for enhanced traction.

First control pressure line 60a extends from the traction solenoid 26. Second control pressure line 60b extends from a transmission low range selector (not shown). The first and second control lines 60a, 60b provide control pressure to a double check valve 61. The double check valve 61 connects one of the control lines 60a, 60b to the air suspension control valves 54. The control line selected is the one supplying the highest pressure. In addition, proportioning valves 62 associated with the brake actuators of the non-drive tag axle 12 are provided with control pressure from the double check valve 61. Typically, the traction solenoid 26 supplies 110 to 120 psi air pressure to the first control line 60a during a traction event and 0 psi otherwise. The transmission low range selector supplies air pressure at 60 psi when the transmission is in low gear. Otherwise the transmission low range selector supplies 0 psi to the double check valve 61 via the second control line 60b. If a traction control event occurs, air pressure from the antilock/traction controller is directed to the suspension control valves 54 and the proportioning valves 62 to isolate the braking to the non-drive axle from the drive axle. This initiates a load transfer and limits brake drag on the non-drive axle during a traction event.

Figure 2:
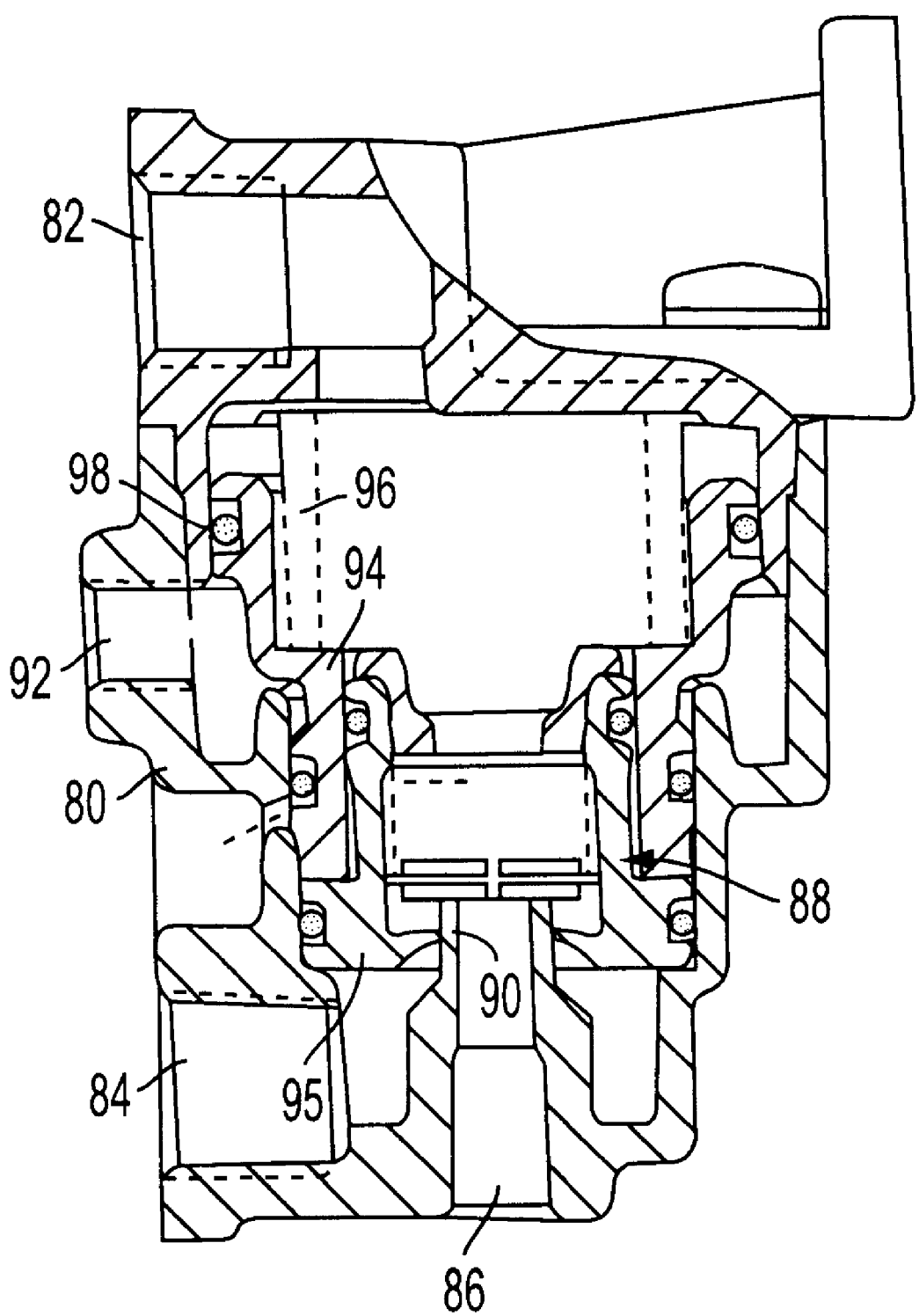
FIG. 2 which is a longitudinal cross-section of a preferred proportional load transfer valve.

Particular structural details of a preferred proportional load transfer valve are shown in FIG. 2. A valve housing 80 includes a first or supply port 82 that communicates with the air bag suspension assembly associated with the drive axle. In the valve position shown in FIG. 2, the supply port 82 is in communication with a second or delivery port 84 that communicates with the tag axle suspension airbags. In addition, communication with a third or exhaust port 86 is precluded as a result of the biased inlet/exhaust valve 88. The inlet/exhaust valve is shown in a closed position with exhaust seat 90, although it will be understood that the valve 88 is selectively moved from the seat in response to pressure changes. A fourth or control port 92 receives a pneumatic signal from the double check valve 61. Therefore, for example, during a traction event the double check valve 61 delivers control pressure from the traction control solenoid valve to the control port 92. The pneumatic pressure introduced at the control port pressurizes the underside of piston 94. Pressure on underside of piston 94 overcomes biasing forces of a spring 96 and pressure at the supply port 82. The piston 94 includes a sliding seal such as O-ring 98. If the force provided by the control port pressure is greater than the sum of forces provided by the spring 96 (if equipped) and the supply port pressure, the piston is moved upwardly from the position shown in FIG. 2. This movement allows the inlet/exhaust valve 88 to open relative to the exhaust seat 90. Pressure at the delivery port 84 pressurizes the underside of a second piston 95 and therefore tends to open the inlet/exhaust valve. Pressure at the supply port 82 pressurizes the topside of the second piston 95 and therefore tends to close the inlet/exhaust valve. The exposed surface areas of the underside and topside of the second piston are different. For example, the topside surface area of the second piston 95 is half that of the underside. Therefore, the inlet/exhaust valve toggles from open to closed when the pressure at the delivery port 84 falls below half that of the supply port 82. Of course other significant ratios may be used without departing from the scope and intent of the present invention.

The exhaust port 86 is selectively opened when the delivery port 84 pressure is more than half the supply port pressure. When the inlet/exhaust valve is open, air from the tag axle air bags flows through delivery port 84 and through the exhaust port 86 to atmosphere. When enough air escapes the tag axle air bags to reduce the pressure to half that of the drive axle air bags, the second piston 95 is forced downwardly and the inlet/exhaust valve is closed. In this manner, the air pressure in the tag axle air bags is reduced to half that of the drive axle air bags during a traction control event. Again, these ratios can be changed as a result of different surface area ratios between the topside and underside of the second piston 95.

As a result of the reduction in tag axle air bag pressure more of the burden of the trailer load shifts to the drive axle air bags. A level sensor (not shown) takes note of this shift and sends a control signal to a height control valve 99. The height control valve 99 reacts to return the trailer to its original position by increasing the pressure in the drive axle air bags through fluid delivery lines 97. If the trailer is carrying a heavy load, the drive axle air bag pressure and therefore the pressure at the supply port 82, reaches a level whereby the control port 92 pressure lifting piston 94 is overcome and the piston 94 moves downward. Piston 94 comes in contact with the second piston 95 thereby increasing the effective surface area of the topside of the second piston 95. The increase in topside surface area effectively changes the pressure ratios between the drive axle and tag axle air bags. In this way, heavy loads automatically are shared more evenly than light loads during a traction event and the weight on the drive axle is kept at an appropriate level.

Figure 3:
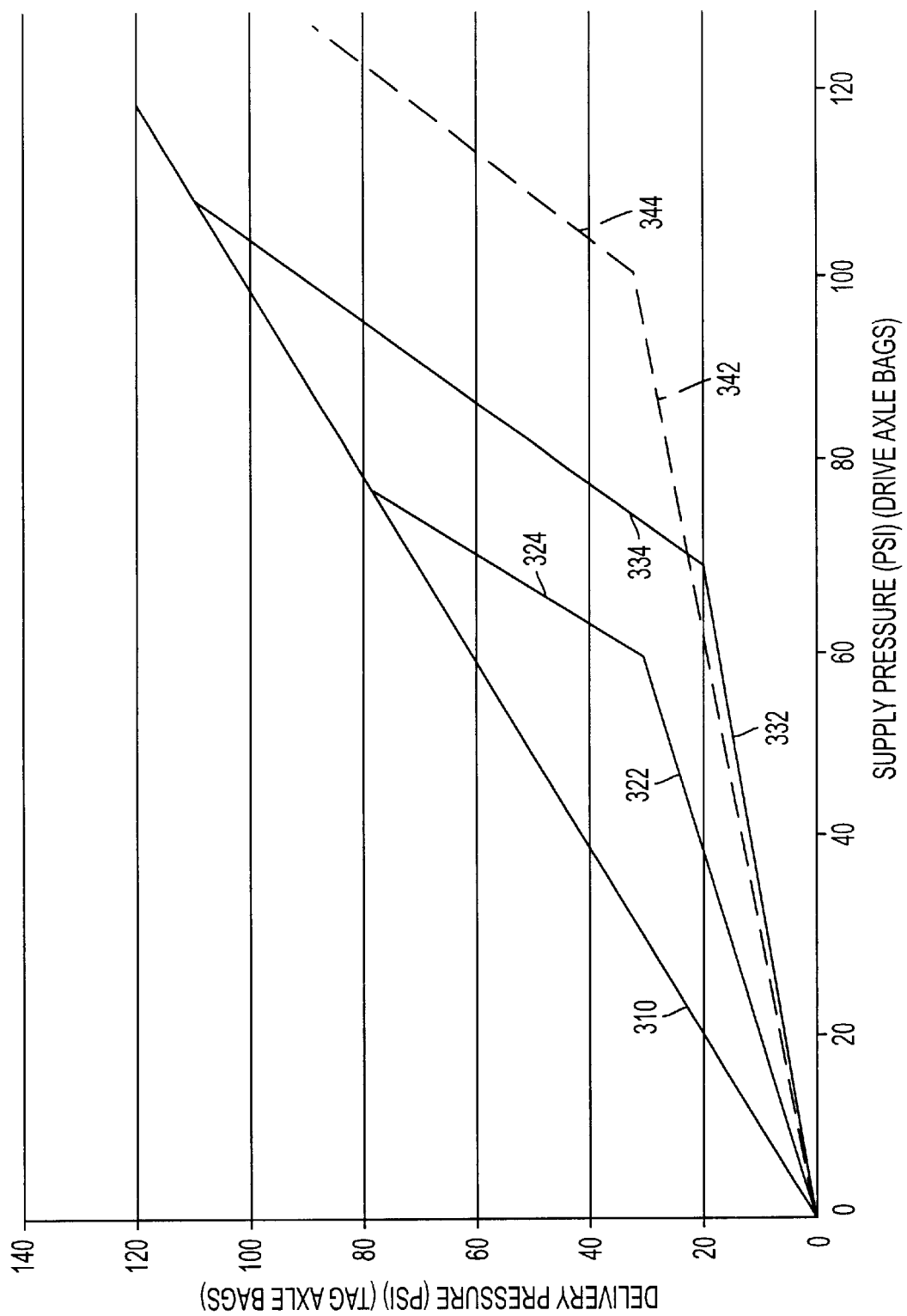
FIG. 3 which is a graphical representation of the supply and delivery pressures provided by the valve of FIG. 2 under various designs and operating modes.

These various operating modes are achieved, for example, through the design and selection of second piston 95 topside and underside surface areas, as well as spring 96 force and control pressures delivered to the control port 92. Referring to FIG. 3, a first line 310 represents a relationship between drive and tag axle bag pressures in the case where the weight of the load is evenly distributed. Operation along this curve is achieved by applying 0 psi to the control port 92. The spring 96 urges the piston downwardly and the drive axle bags are placed in communication with the tag axle bags through a path from the supply port 82 and the delivery port 84. The height control valve 99 varies the pressure in all the bags as necessary to keep the load level. Second and third lines illustrate operation during a traction event on a system normally operated along the first line 310. During a traction event, a control pressure, for example 120 psi, is delivered to the control port 92. The piston 94 is forced upwardly and air is bled from the tag axle bags, as described above, until the tag axle bag pressure is reduced to allow the inlet/exhaust valve to close. If the trailer is lightly loaded, then the height control valve 99 will increase the drive axle air bag pressure a small amount in order to re-level the trailer. In this case operation is along the second line 322 until the traction event has ended. If the trailer is carrying a heavy load then the height control valve will have to increase the drive axle air bag pressure further. This eventually urges the piston 94 into contact with the second piston 95 effectively changing the surface area ratio of the two sides of the second piston 95. Therefore, operation is along the third line 324. For example, when the drive axle air bag pressure is in this higher range the spring force of spring 96 and the force due to the pressure at the supply port 82 are enough to overcome the control port 92 pressure. The piston 94 presses down on the second piston 95 and the drive axle and tag axle air bags are placed in communication. Air flows from the drive axle bags to the tag axle bags due to the pressure differential between them. This increases the tag axle bag pressure.

The newly increased tag axle bag pressure works in concert with the control pressure and eventually closes the communication path. Therefore, operation continues at a new equilibrium point somewhere on line 324. The selection and design of appropriate components for suspension control valves 54 confines operation to be along the first, second and third lines 310, 322, 324. Of course, other modes of operation are possible. By making different selections, for example, selecting a higher topside to underside surface area ratio for the second piston 95, and normally providing a control pressure of, for example 60 psi, a higher percentage of trailer load can be placed on the drive axle. For example, fifth and sixth lines 332, 334 illustrate operation when the topside to underside surface area ratio of the second piston 95 is approximately 3.5 to 1 and a control pressure of 60 psi is applied. When there is no traction event and the transmission is in a low gear the transmission low range selector supplies fluid line 60b with 60 psi of air pressure and fluid line 60a carries 0 psi. Therefore, the double check 61 valve delivers the higher 60 psi pressure to the control ports 92 of the suspension control valves 54. If the transmission is shifted to a higher gear range the control pressure drops to 0 psi and operation reverts to line 310. Alternatively if there is a traction event, then line 60a carries 120 psi and the double check valve 61 switches and supplies 120 psi to the control ports 92. This has the effect of shifting operation to lines 342, 344. Operating on the lines 342, 344 shifts even more weight to the drive axle in order to improve traction.

Figure 4:
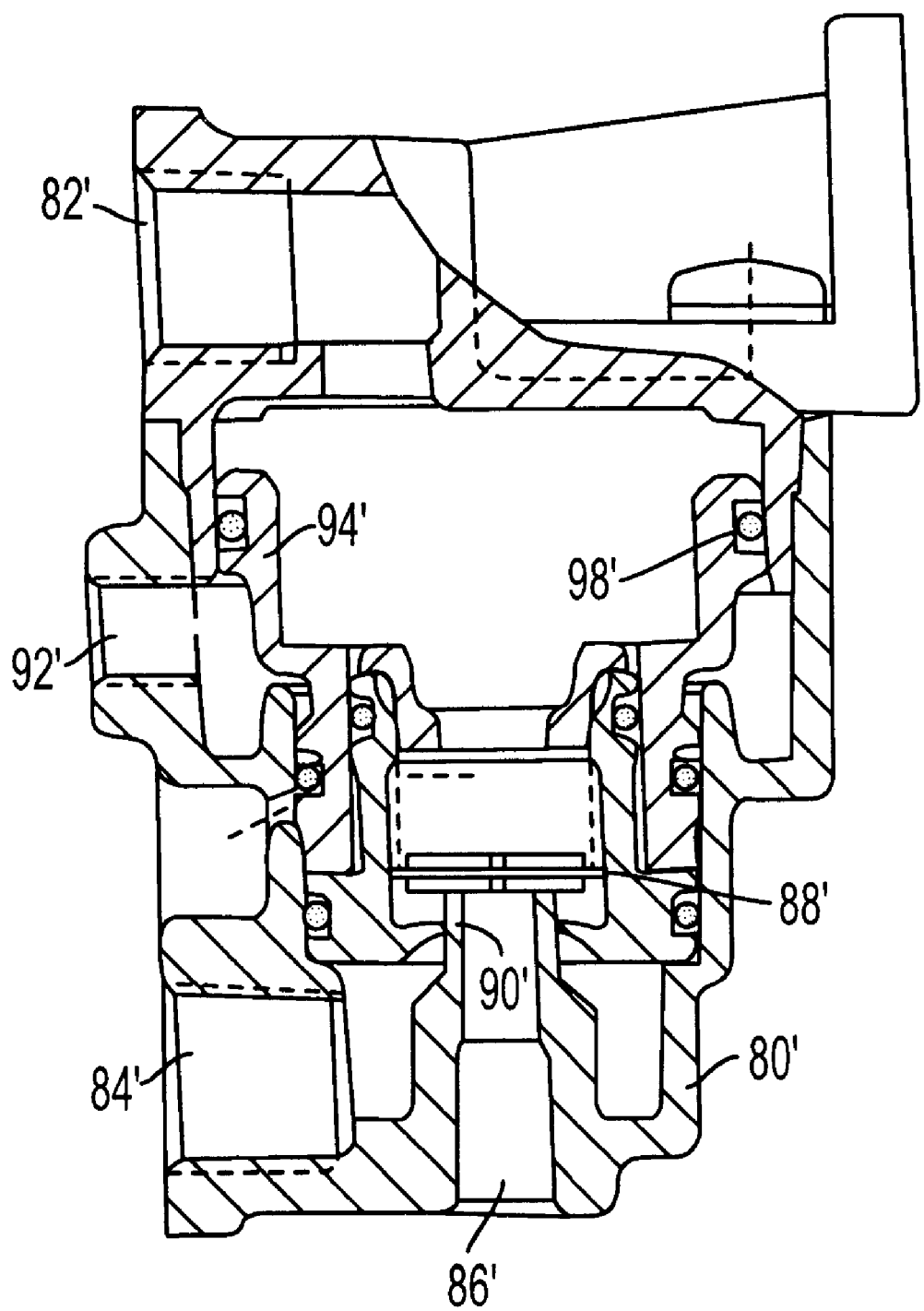
FIG. 4 which is a second preferred arrangement of a proportional load transfer valve; and, FIG. 5 which is a graphical representation of the supply pressure versus the delivery pressure provided by the valve of FIG. 4.
Figure 5:
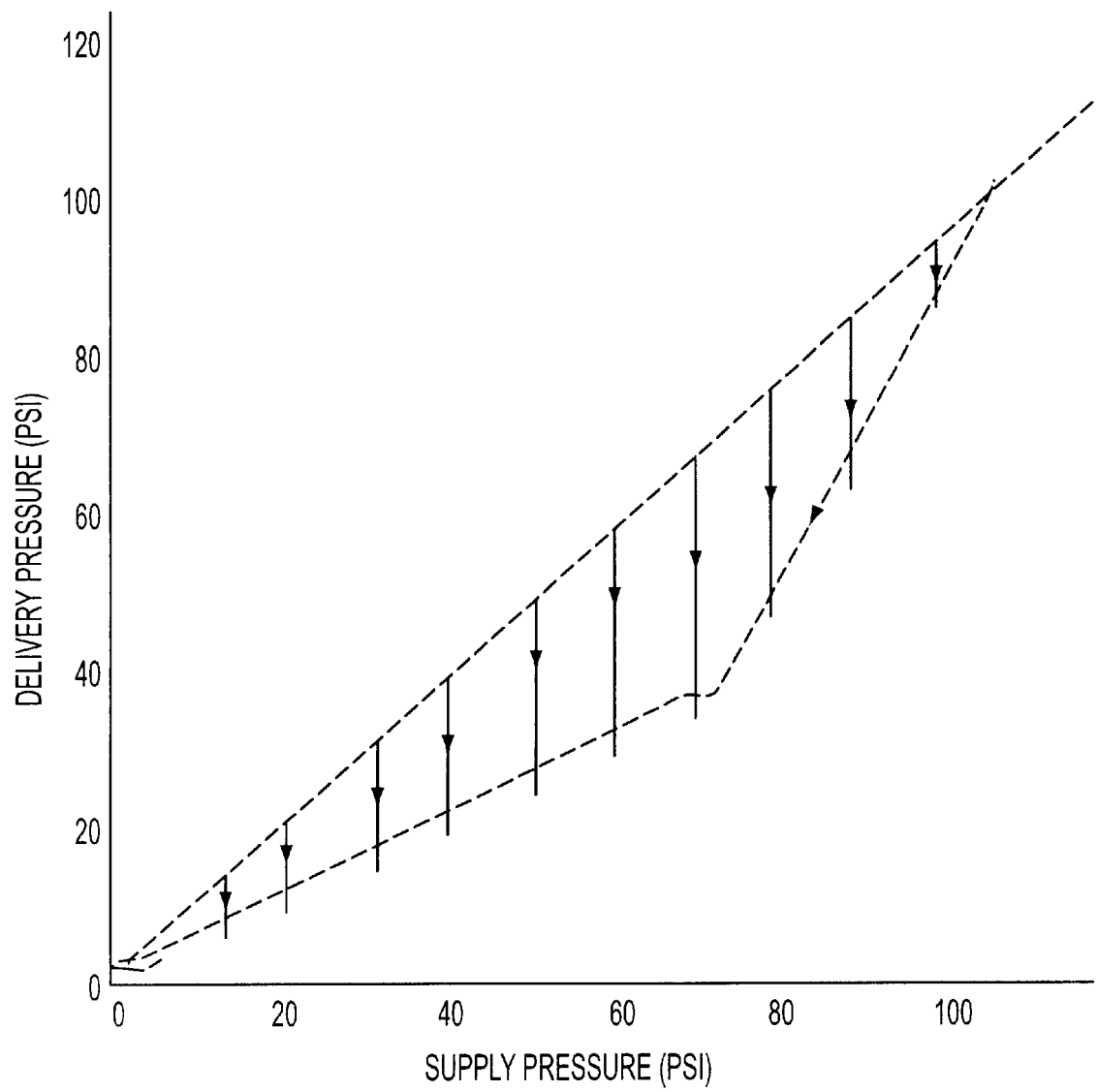

FIGS. 4 and 5 are substantially identical to the embodiment of FIGS. 2 and 3, except that a different setting for the blend-back force is used. In FIG. 4, like elements are identified by like reference numerals with a primed (') suffix. For example, 80' refers to a valve housing, 82' a first or supply port, 84' a second or delivery port, 86' a third or exhaust port, 88' an inlet/exhaust valve, 90' an exhaust seat, 92' a fourth or control port, 94' a piston, and 98' an O-ring, which are structurally and functionally identical to the components described in connection with the embodiments of FIG. 2 unless specifically noted to the contrary. As will be apparent, spring 96 from the embodiment of FIG. 2 is eliminated. Whereas the embodiment of FIGS. 2 and 3 has a setting of 60 psi, the proportional load transfer valve of FIG. 4 is set at 80 psi. Thus, the curve of FIG. 5 illustrates the operating characteristics of the valve that may be compared to those shown in FIG. 3. It will be appreciated, however, that still other settings can be used to achieve a desired operational curve and effectively transfer a portion of the weight on the tag axle to the drive axle in response to a pneumatic signal from a traction control event. In order to prevent damage to, for example the drive axle 10, the suspension control valves 54 are preferably designed to ensure that prolonged overloading of the drive axle is prevented.

It will be appreciated that the valve may adopt other configurations than the particular structural configuration illustrated herein that achieves these objectives.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A traction control system for a vehicle having a suspension control assembly, the system comprising:
   a drive axle;
   a non-drive axle;
   the suspension control assembly operative to support a vehicle load;
   an actuator assembly operatively associated with the suspension control assembly for selectively transferring a predetermined ratio of vehicle load from one axle to the other axle; and
   an operating mode selector operative to select actuator assembly operating modes having a double check valve operative to select for output, an input pressure, from among a plurality of input pressures, the output operative as a control signal for selection of actuator assembly operating modes.

2. The traction control system of claim 1 further comprising a level controller operative for adjusting a vehicle load relative to the drive and non-drive axles.

3. The traction control system of claim 1 wherein the suspension control assembly further comprises:
   at least one drive axle air bag disposed between the drive axle and the vehicle load operative to support a portion of the load; and
   at least one non-drive axle air bag disposed between the non-drive axle and the vehicle load operative to support a portion of the load.

4. The traction control system of claim 1 wherein the actuator assembly comprises a valve assembly operative to provide different pressures to components of the suspension control assembly in response to a control signal.

5. The traction control system of claim 1 wherein the plurality of input pressures comprises a traction event signal from a traction controller.

6. The traction control system of claim 1 wherein the plurality of input pressures comprises a vehicle operation mode signal.

7. The traction control system of claim 1 wherein the plurality of input pressures comprises a transmission range signal from a transmission range selector.

8. A method of controlling traction of a wheel associated with a drive axle on a vehicle having a suspension control assembly associated with a non-drive axle and the drive axle comprising the steps of:

providing a suspension control assembly associated with the drive axle and the non-drive axle;
   selecting an output, from among a plurality of input pressures, to be used as a control signal; and
   regulating the suspension control assembly in response to the control signal so as to control an amount of weight born by the drive axle.

9. The method of controlling traction of a wheel of claim 8 wherein the regulating step comprises controlling the weight born by the drive axle to be about fifty percent of the total vehicle weight.

10. The method of controlling traction of a wheel of claim 8 wherein the regulating step comprises controlling the weight born by the drive axle to be selected from about one hundred percent of the total vehicle weight and a maximum weight limit for the drive axle, the selected weight being the lighter of the two weights.

11. The method of controlling traction of a wheel of claim 8 wherein the control signal indicates a vehicle operating mode.

12. The method of controlling traction of a wheel of claim 8 wherein the control signal indicates a manual selection.

13. The method of controlling traction of a wheel of claim 8 wherein the regulating step comprises controlling the weight born by the drive axle to be momentarily above a maximum weight limit for the drive axle.

* * * * *